United States Patent
Yeomans

(10) Patent No.: US 12,436,124 B2
(45) Date of Patent: Oct. 7, 2025

(54) METHOD OF CALIBRATING AND OPERATING APPARATUS FOR USE IN ASSESSING THE CARBON CONTENT OF SOILS

(71) Applicant: YS2 Humus Pty Limited, Southport (AU)

(72) Inventor: Allan James Yeomans, Surfers Paradise (AU)

(73) Assignee: YS2 Humus Pty Limited, Southport (AU)

(*) Notice: Subject to any disclaimer, the term of this patent is extended or adjusted under 35 U.S.C. 154(b) by 429 days.

(21) Appl. No.: 17/722,869

(22) Filed: Apr. 18, 2022

(65) Prior Publication Data
US 2023/0125138 A1    Apr. 27, 2023

(51) Int. Cl.
*G01N 25/22*    (2006.01)
*G01N 5/04*    (2006.01)
*G01N 33/24*    (2006.01)

(52) U.S. Cl.
CPC ............... *G01N 25/22* (2013.01); *G01N 5/04* (2013.01); *G01N 33/24* (2013.01)

(58) Field of Classification Search
CPC ........... G01N 25/22; G01N 5/04; G01N 33/24
See application file for complete search history.

(56) References Cited

U.S. PATENT DOCUMENTS

| | | | |
|---|---|---|---|
| 5,651,614 A * | 7/1997 | Juneau | G01N 33/2811 374/23 |
| 2015/0247787 A1* | 9/2015 | Yeomans | G01N 5/045 73/865 |
| 2019/0033241 A1* | 1/2019 | Aoki | G01N 27/043 |

FOREIGN PATENT DOCUMENTS

CN    106124357    * 11/2016    ............... G01N 1/04

* cited by examiner

*Primary Examiner* — Lina Cordero
*Assistant Examiner* — Kaleria Knox
(74) *Attorney, Agent, or Firm* — Weston R. Gould; Dinsmore & Shohl LLP

(57) ABSTRACT

This invention relates to a method of estimating the organic carbon content of soil or changes in organic carbon content of the soil over time using Loss On Ignition (LOI) in which a first sample of the soil is taken from a selected location and heated by forcing heated oxygen-containing gas through the soil sample, monitoring the temperature of the sample by using at least one temperature sensing means within the soil sample and varying the supply of the gas to the sample in accordance with the temperature of the sample as sensed by the sensing means to remove organic materials including organic carbon from the soil sample by burning off or oxidising the organic materials.

11 Claims, 2 Drawing Sheets

METHOD OF CALIBRATING AND OPERATING APPARATUS FOR USE IN ASSESSING THE CARBON CONTENT OF SOILS

TECHNICAL FIELD OF THE INVENTION

This invention relates to a method of calibrating and operating apparatus for use in assessing the carbon content of soils.

BACKGROUND ART

It is known to test soils to assess the carbon content of soils by the use of a Loss on Ignition test (LOI). In such a test, a sample of soil is strongly heated which causes volatile substances in the sample to escape until the mass of the sample ceases to change. The difference in weight before and after the ignition test represents the amount of organic material that was present in the sample. The organic carbon content in the soil can then be estimated from this weight change, the organic carbon content being in a known percentage range of organic material in the sample.

In International patent application No. PCT/AU2013/001511, the contents of which are incorporated by reference herein, I disclose a method of and apparatus for obtaining an estimation of the organic carbon content of soil and/or variations or changes in organic carbon content of soil over time which uses a Loss on Ignition technique. In that method, one or more samples of soil are supported on gas permeable barriers arranged within an elongated hollow chamber after which a heated gas is supplied via a suitable valve to the housing for passage through the soil sample/s to initially remove moisture from the samples to dry the soil samples and thereafter to remove burn off organic materials including organic carbon in the soil sample or samples, with the change of weight of the soil sample/s due to the heating process correlating to the organic carbon content in the soil sample to be obtained. After a selected period of time subsequent further samples of soil can be taken from the same area and tested as above so that increases in organic carbon content which is equivalent to increases in carbon dioxide sequestration in the soil can serve as a basis for remuneration in a program which rewards carbon dioxide sequestration.

In the method and apparatus disclosed in the aforesaid International patent application suitable temperatures sensing means may be provided at least downstream of one or more of the sample holders to monitor the temperature of the gas after it passes through the soil sample/s and the valve may be operated to control the flow of oxygen-containing gas in accordance with feedback received from the temperature sensing means. However, as the temperature sensing means are provided externally of the sample, their readings do not always provide an accurate indication of the temperature to which the soil samples are heated meaning that the soil samples may not be sufficiently heated to remove the carbon from the samples. Alternately, the samples may be overheated.

With any Loss On Ignition soil tests designed to determine changes in the organic carbon content of the soil, false readings will occur in some soil samples due to the presence of non-organic material that will react chemically at the higher than normal daytime temperatures used in a Loss On Ignition test. Errors may also occur due to the presence of minerals that can chemically react with the molecules that are present and derive from the chemical changes that occur in the breakdown of the organic materials.

It would be desirable to have a method and apparatus in which one or more of the above disadvantages were addressed.

SUMMARY OF THE INVENTION

In accordance with a first aspect, the present invention provides a method of estimating the organic carbon content of soil or changes in organic carbon content of the soil over time using Loss On Ignition (LOI) in which a first sample of the soil is taken from a selected location and heated by forcing heated oxygen-containing gas through the soil sample, monitoring the temperature of the sample by using at least one temperature sensing means within the soil sample and varying the supply of said gas to the sample in accordance with the temperature of the sample as sensed by the sensing means to remove organic materials including organic carbon from the soil sample by burning off or oxidising the organic materials.

The temperature sensing means may be located centrally within the soil sample. Alternatively, the temperature sensing means may comprise two or more temperature sensors which may be located at equispaced positions between the top and bottom of the soil sample.

The supply of gas may be varied by varying the temperature and/or flow of gas. The gas contains, or may be enriched with, oxygen or diluted with an inert or semi-inert gas such as nitrogen so as to control combustion of or in the soil sample.

In accordance with a further aspect, the present invention provides an apparatus for use in estimating the organic carbon content of soil or changes in organic carbon content of the soil over time using Loss On Ignition (LOI), the apparatus including a housing defining an upright elongated chamber, gas permeable means for supporting one or more samples of the soil within the chamber, one or more temperature sensing means located within the soil sample, means for forcing heated oxygen-containing gas downwardly through the chamber and the soil sample or samples therein and means for controlling said flow of gas in accordance with the temperature sensed by the temperature sensing means. As the temperature of the soil samples is directly monitored, the apparatus may be efficiently operated to initially remove moisture from the soil sample or samples to dry the sample or samples and subsequently remove by burning off or oxidising organic materials including carbon from the soil sample or samples. The change of weight in the soil samples due to the removal of organic materials can be measured to provide an indication of organic carbon content of the soil or changes in the organic carbon content of the soil.

The temperature sensing means may be located centrally within the soil sample. Alternatively, the temperature sensing means may comprise two or more temperature sensors which may be located at equispaced positions between the top and bottom of a soil sample The supply of gas may be varied by varying the temperature and/or flow of gas and for this purpose the gas flow may be controlled by a suitable control valve. The gas may flow past or through a heating element which may be controlled to vary the temperature of the gas for supply to the chamber. The heating element may typically be an electric heating element and the current supply to the heating element may be controlled to control heating of the gas. Alternatively or additionally, the heating element may comprise a plurality of heating elements selected ones of which may be operated to vary heating of the gas.

A single soil sample may be used. Alternatively, a plurality of soil samples may be used, and the soil samples are arranged within the chamber in series such that heated gas can be passed through the respective soil samples in turn. Preferably the housing and thus chamber may have a central longitudinal axis with an inlet at one end for gas and when operated, heated oxygen-containing gas is forced to flow downwardly through the soil sample/s. The temperature of the sample/s may be monitored by using at least one temperature sensing means within the soil sample with the supply of said gas to the sample/s being varied in accordance with the temperature of the sample/s as sensed by the sensing means to efficiently remove organic materials including organic carbon from said soil sample/s by burning off or oxidising said organic materials.

Preferably respective gas permeable means are provided to support the one or more soil samples within the chamber. Suitably the gas permeable means form barriers which extend diametrically of the chamber. The gas permeable means may comprise a soil sample holder which includes a grid or grating. The or each grid or grating is supported on a central shaft which is suitably hollow and which can serve as a conduit to receive cables for connection to the temperature sensors.

Errors in the results may be caused by the presence in the soil samples of non-organic materials that may chemically react with the soil sample or the presence of minerals that react chemically with molecules that occur in the breakdown of the organic materials. To eliminate or ameliorate these errors, the method and apparatus described above may be used to create a calibration graph.

In accordance with a still further aspect, the present invention provides a method of calibrating a soil test using Loss On Ignition, the method comprising the steps of obtaining a sample of material from a test area of the soil, the test area being known to have a low organic matter content, producing from the sample, a plurality of sub-samples, each sub-sample having a similar weight to each other, adding a known quantity of organic matter to each of the sub-samples, subjecting each of the composite sub-samples to a Loss On Ignition test as described in the first aspect, and plotting the loss of weight of each of the sub-samples against the weight of organic material added to each sub-sample.

The test area of soil which has a known low organic content may comprise a subsoil. The added organic material may suitably comprise a composition as near as practical to humus, such as peat.

The graph is plotted, preferably using the X-axis to indicate the weight of the humus or other organic material added and the Loss On Ignition test weight determined is plotted on the Y-axis. Thus, a Loss On Ignition test on any sample obtained from the test area will give a weight loss which can be noted on the Y-axis and will, on the X-axis give an accurate and true Loss On Ignition weight and therefore an accurate assessment of the carbon content of the soil sample.

Where the apparatus is used for establishing a calibration graph, the respective soil samples containing the added organic materials may be subject in turn to a Loss on Ignition test. Alternately a plurality of soil samples each containing a different quantity of organic material may be subject simultaneously to a Loss on Ignition test. For this purpose and as described above, the soil samples can be arranged within the chamber in series such that heated gas can be passed through the respective soil samples simultaneously.

Any one or more of the above embodiments or preferred features can be combined with any one or more of the above aspects.

BRIEF DESCRIPTION OF THE DRAWINGS

In order that the invention may be more readily understood and be clear enough and complete enough for it to be performed by a persons skilled in the art, reference will now be made to the accompanying drawings which illustrate a preferred embodiment of the invention and wherein.

DETAILED DESCRIPTION OF THE PREFERRED EMBODIMENT

Figure 1:
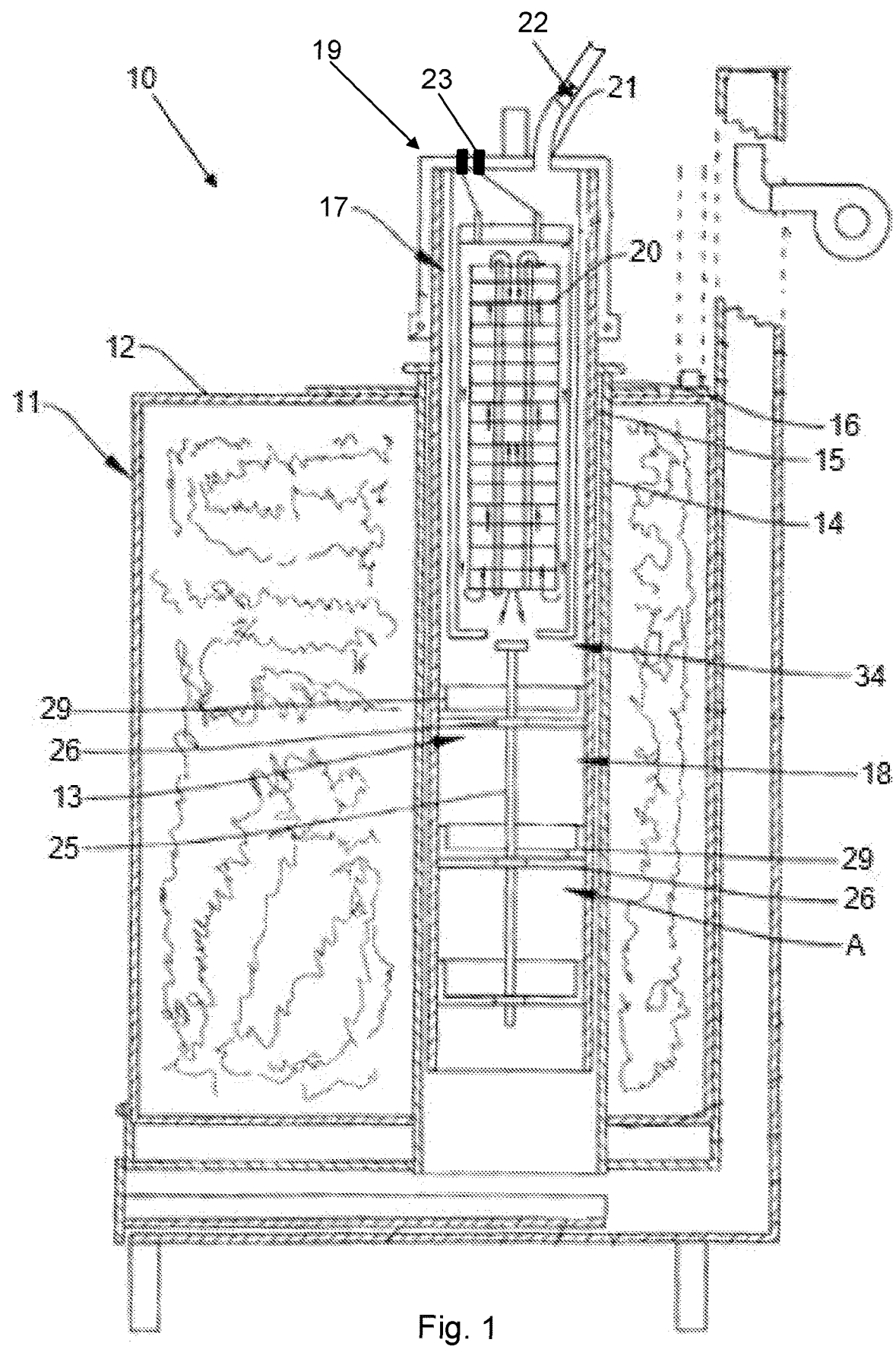
FIG. 1 is a cross sectional side view of apparatus for burning off organic carbon in soil samples by Loss On Ignition according to an embodiment of the invention.

Referring to the drawings and firstly to FIG. 1, there is illustrated apparatus 10 for use in heating a sample or samples of soil to remove organic carbon therefrom for the purpose obtaining an indication of the carbon content of the soil sample. The apparatus 10 is similar to that disclosed in International Patent Application PCT/AU2019/050845 and comprises an oven 11 having an outer hollow casing 12 in which is supported a heating chamber 13 for use in heating a sample or samples of soil for the purpose of burning off of organic carbon in the soil samples for subsequent assessment of the carbon content of the soil sample and thus the soil from which the sample was taken. The heating chamber 13 is of substantially the same or similar configuration as the heating chamber described in aforesaid International Patent Application PCT/AU2013/001151.

The heating chamber 13 comprises a main fixed outer elongated tubular housing 14 which is of a circular cross section and the housing 14 is supported in an upright attitude. The housing 14 is open at its upper end to receive coaxially therein with clearance an inner tubular housing 15. The upper end of the housing 15 is open at 16 to accept therein a primary air or gas heater 17 and sample holder 18 which is interconnected with the heater 17 and located on the lower side thereof. The heater 17 and holder 18 may be withdrawn from or inserted into the upper open end 16 of the housing 15. The heater 17 includes an outer hollow housing 19 which accommodates an electrical heating wire or element 20 and the top of the housing 19 is provided with a connector 21 for connection to a compressed gas or air source such as a compressor via a suitable control valve 22. The housing 19 also carries terminals 23 for connecting the heater wire or element 20 to a source of power.

Figure 2:
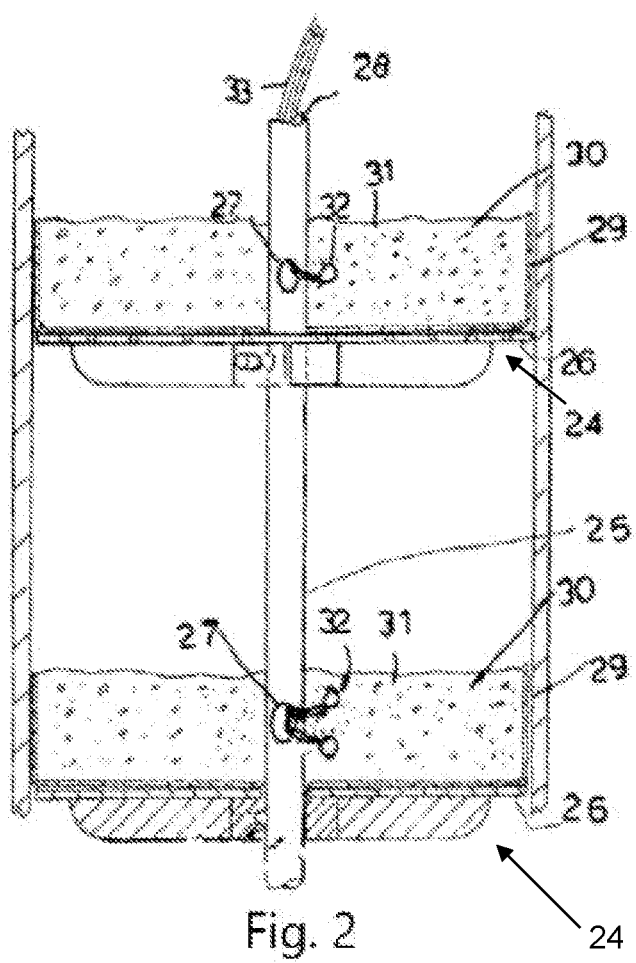
FIG. 2 is an enlarged cross sectional view of the region A of FIG. 1.

The soil sample holder 18 as also shown in FIG. 2 includes a series of soil sample holding units 24 which are arranged in use in spaced apart positions along a central hollow shaft 25. The soil sample holding units 24 include an air or gas permeable grid or mesh base member 26 which may be fixed to the shaft 25 or may be slidably adjustable along the shaft 25 and fixed at various positions along the shaft 25. The shaft 25 is provided with one or more apertures 27 in its external surface which communicate with the internal shaft passage 28.

To prevent or minimize escape of fine soil particles, the soil sample holding units 24 may be used with a flexible cup shaped member 29 formed of a fabric or other pliable material which is air or gas permeable which can seat on the grid or mesh member 26 to define a compartment 30 for receiving and holding a soil sample 31. The fabric or other pliable material preferably comprises an air or gas permeable material which can handle the temperatures encountered in the apparatus 10. A suitable material may comprise a woven fibreglass cloth. The gas permeable member 29 may be formed or shaped from material which is initially in a flat form which can be folded into a generally cup shaped configuration. The cup shaped member 29 is also provided with a central opening which can neatly but firmly receive the shaft 25 and substantially seal thereagainst. One or more temperature sensors 32 are located within a compartment 30 such that when the compartments 30 are filled with soil, each sensor 32 is embedded within the soil sample 31. When only one sensor 32 is used it is preferably located centrally within the compartment 30 and midway between the top and bottom of the soil in the compartment 30. When two or more sensors 32 are used they are preferably equispaced between the top and bottom of the soil 31. Wires or cables 33 may be passed through along the interior passage 28 of the shaft 25 and outwardly through an opening 27 for connection to the sensor/s 32 for temperature monitoring purposes.

In use samples of soil 31 taken from an area where carbon content is to be assessed is screened to remove all fibrous material such as plant and animal material not yet decomposed, and the soil samples are then placed within the respective compartments 30. After initial weighing, current can then be applied to the heater element 20 and compressed oxygen containing air or gas supplied from the compressed air or gas source via the valve 22 and connector 21. Air will be forced in a serpentine manner through the heater 17 past the element 20 to be heated and exit at the lower end 34 of the heater 17 and the heated air will then be forced through the soil samples 31. Initially the heater 17 is operated to remove moisture from the soil samples to dry the soil sample/s 31. When the sensed temperature increases above 100° C., which is the boiling point of water or moisture within the soil samples 31, the soil samples 31 will be dry. The soil samples 31 are then reweighed to provide an indication of the weight of the soil samples 31 after the drying process and prior to the carbon removal process.

The soil sample holder 18 is then reinserted into the oven 11 and current is again applied to the heater 17 and compressed gas supplied through the connection 21. Typically, the samples 31 are heated to temperatures above or in the region of 375° C. and maintained at those temperatures for an extended period of time for example 10-60 minutes to ensure that organic carbon and other organic materials are burnt off. This temperature and time however can be varied by varying current supply to the heater 17 and also by varying the air or gas supply. To ensure that the temperature of the soil samples 31 does not increase beyond predetermined limits, gas flow through the samples 31 may be restricted. This restricts the volume of oxygen supply to thereby prevent excessive burning of materials within the soil samples 31. The heating time and temperature of air or gas supplied may also be varied depending on the samples 31 being tested. Reweighing will give a figure, which will correlate to the organic carbon content in the soil samples 31.

The method and apparatus described above may also be used for calibration of the system so that adjustments to the results may be made where errors may arise due to the presence in the soil samples of non-organic materials that may chemically react with the soil sample or due to the presence of minerals that react chemically with molecules that occur in the breakdown of the organic materials.

For this purpose, a sample of material from a test area of soil which is known to have a low organic matter content, such as subsoil, is extracted from the ground and a plurality of sub-samples prepared with each sub-sample having a similar weight to each other. Then known quantities of organic matter are added to respective sub-samples. Each composite sub-sample is subject to a Loss On Ignition test using the method and apparatus as described above. The loss of weight of each sub-sample during the LOI procedure is then plotted against the weight of organic material added to each said sub-sample.

Figure 3:
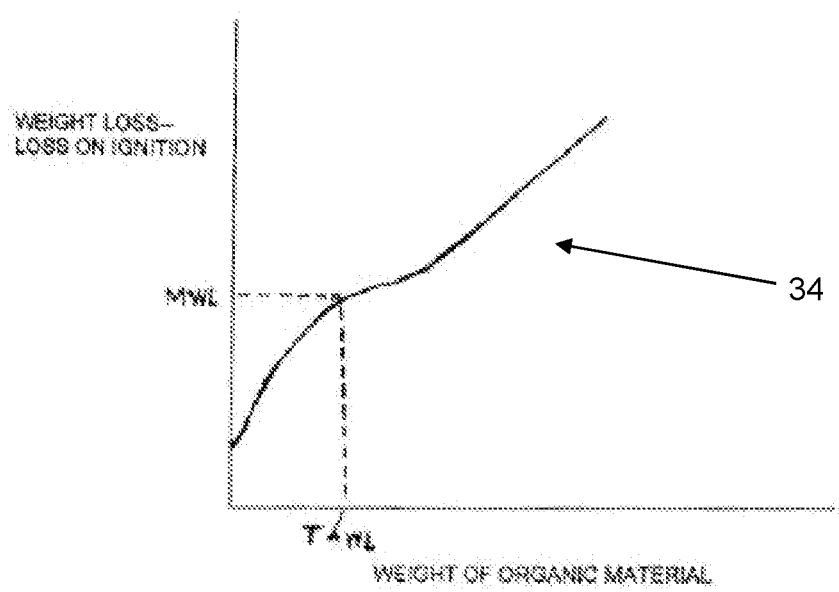
FIG. 3 is a calibration graph prepared using the method and apparatus of the present invention showing added organic material weight plotted against Loss on Ignition weight.

The X-axis is used to indicate for each sub-sample the weight of organic material added and the Y-axis to indicate the corresponding weight loss due to Loss On Ignition. Plotting the results for each sample results in a graph 34 as shown in FIG. 3.

Thus for any subsequent Loss On Ignition test on any sample obtained from the test area, the measured weight loss can be noted on the Y-axis such as MWL using the graph 34, this will correspond on the X-axis to a true and accurate weight loss TAWL thereby giving an accurate and true Loss On Ignition weight loss of organic material in the sub-sample.

It will be appreciated that the apparatus of the invention may be in many different configurations other than that illustrated and described to perform the method of the invention.

It should be noted that reference to the prior art herein is not to be taken as an acknowledgement that such prior art constitutes common general knowledge in the art.

It will be realized that the foregoing has been given by way of illustrative example only and that all other modifications and variations as would be apparent to persons skilled in the art are deemed to fall within the broad scope and ambit of the invention as herein set forth.

As used herein the term "and/or" means "and" or "or", or both.

As used herein "(s)" following a noun means the plural and/or singular forms of the noun.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the scope of the above described invention.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The invention claimed is:

1. Apparatus for use in estimating the organic carbon content of soil or changes in organic carbon content of the soil over time using Loss On Ignition (LOI), the apparatus comprising:
    a housing defining an upright elongated chamber;
    a gas permeable barrier for supporting at least one sample of the soil within the chamber;
    at least one temperature sensor located within the soil sample, wherein the at least one temperature sensor located within the soil sample comprises two or more temperature sensors which are located at equispaced positions between the top and bottom of the soil sample;
    a source of compressed gas and at least one heating element for forcing a flow of heated oxygen-containing gas downwardly through the chamber and the at least one soil sample therein; and
    a controller for controlling the flow of gas in accordance with the temperature sensed by the temperature sensing means.

2. The apparatus of claim 1, wherein the at least one temperature sensor located within the soil sample is located centrally within the soil sample.

3. The apparatus of claim 1, comprising a control valve and/or controllable heating element for varying the temperature and/or flow of gas.

4. The apparatus of claim 3, wherein at least one heating element is controlled to vary the temperature of the gas for supply to the chamber.

5. The apparatus of claim 1, wherein when a plurality of soil samples are used the soil samples are arranged within the chamber in series such that the heated gas can be passed through the respective soil samples in turn.

6. The apparatus of claim 1, wherein the housing and thus the chamber have a central longitudinal axis with an inlet at one end for the gas.

7. The apparatus of claim 1, wherein the gas permeable barrier extends diametrically of the chamber.

8. The apparatus of claim 7, wherein the gas permeable barrier is a soil sample holder which includes one member selected from the group consisting of a grid, a grating, or combinations thereof, and further wherein the holder is supported on a central shaft which is suitably hollow and which can serve as a conduit to receive cables for connection to the at least one temperature sensor.

9. A method of estimating the organic carbon content of soil or changes in organic carbon content of the soil over time using Loss On Ignition (LOI) with the apparatus of claim 1 in which:
    a first sample of a soil is taken from a selected location and heated by forcing heated oxygen-containing gas through the soil sample, monitoring a temperature of the sample by using the at least one temperature sensing means within the soil sample and varying a supply of the gas to the sample in accordance with the temperature of the sample as sensed by the sensing means to remove organic materials including organic carbon from the soil sample by burning off or oxidising the organic materials.

10. The method of claim 9, wherein the supply of gas is varied by varying the temperature and/or flow of gas.

11. The method of claim 10, wherein the gas further is one member selected from the group consisting of: enriched with oxygen, diluted with an inert gas, diluted with a semi-inert gas, diluted with nitrogen or combinations thereof, so as to control combustion associated with the soil sample.

* * * * *